(12) United States Patent  
Edwards

(10) Patent No.: US 8,746,568 B2  
(45) Date of Patent: Jun. 10, 2014

(54) DATA TRANSFER USING BARCODES

(71) Applicant: Intercede Limited, Lutterworth (GB)

(72) Inventor: Christopher Paul Edwards, Nottingham (GB)

(73) Assignee: Intercede Limited (GB)

( * ) Notice: Subject to any disclaimer, the term of this patent is extended or adjusted under 35 U.S.C. 154(b) by 0 days.

(21) Appl. No.: 13/712,400

(22) Filed: Dec. 12, 2012

(65) Prior Publication Data

US 2013/0153666 A1    Jun. 20, 2013

(30) Foreign Application Priority Data

Dec. 16, 2011  (GB) .................................. 1121668.6

(51) Int. Cl.  
*G06K 9/22*  (2006.01)

(52) U.S. Cl.  
USPC .............................. 235/462.25; 235/462.12

(58) Field of Classification Search  
USPC ....................................... 235/462.25, 462.12  
See application file for complete search history.

(56) References Cited

U.S. PATENT DOCUMENTS

2003/0236680 A1   12/2003   Holoubek  
2006/0071077 A1*  4/2006   Suomela et al. ......... 235/462.01

FOREIGN PATENT DOCUMENTS

| EP | 2431912 A1 | 3/2012 |
|---|---|---|
| GB | 2471567 A | 1/2011 |
| WO | 2006/038096 A1 | 4/2006 |

OTHER PUBLICATIONS

European Patent Office, International Search Report of PCT Application No. PCT/GB2012/053124, completed Mar. 13, 2013, 3 pages.  
UK Intellectual Property Office, Search Report of GB Patent Application No. 1121668.6, dated Apr. 16, 2012, 3 pages.

* cited by examiner

*Primary Examiner* — Kristy A Haupt  
(74) *Attorney, Agent, or Firm* — Greenberg Traurig, LLP

(57) ABSTRACT

Data transfer using barcodes is described. In one example data can be transferred between a first device and a second device in close proximity to each other using repeating barcode sequences. For example at the first device a data item can be encoded as a sequence of barcodes, each barcode includes an indicator of the number of barcodes in the sequence and the position of the barcode in the sequence. To receive the data at a second device the barcode sequence can be captured and stored, for example using a digital camera associated with the device, and the barcodes subsequently decoded using the captured sequence. The data contained in each of the barcodes in the sequence can be reassembled by the receiving device to obtain the transmitted data.

20 Claims, 6 Drawing Sheets

DATA TRANSFER USING BARCODES

BACKGROUND

Small amounts of data are increasingly being transferred between devices. This can include, for example, cryptographic or security data or simply the transfer of contact details or the like. Therefore simple techniques for transferring data are required.

One method of transferring data is via a Bluetooth™ file transfer that enables wireless connections and data exchange between two devices in proximity to each other. Bluetooth™ requires that devices between which data is to be transferred are paired which can take time and may be off-putting to users when only a small amount of data is to be transferred. As the pairing process is two-way this may be a security risk as a malicious user may be able to tamper with a paired device. The power consumption of Bluetooth™ devices can also be high, which can be undesirable for mobile devices.

Near Field Communication (NFC) is another technique used for data transfer between devices. NFC consumes less power than Bluetooth™ for transferring small amounts of data between devices over a short range and does not require pairing of the device. However, NFC is not widely implemented in current devices.

The embodiments described below are not limited to implementations which solve any or all of the disadvantages of known data transmission systems.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

Data transfer using barcodes is described. In one example data can be transferred between a first device and a second device in close proximity to each other using repeating barcode sequences. For example at the first device a data item can be encoded as a sequence of barcodes, each barcode includes an indicator of the number of barcodes in the sequence and the position of the barcode in the sequence. To receive the data at a second device the barcode sequence can be captured and stored, for example using a digital camera associated with the device, and the barcodes subsequently decoded using the captured sequence. The data contained in each of the barcodes in the sequence can be reassembled by the receiving device to obtain the transmitted data.

According to one aspect, there is provided a computer implemented method of receiving data comprising: capturing a repeating sequence of barcodes using a capture device; storing the captured sequence of barcodes on a storage device; retrieving the captured sequence from the storage device; decoding each barcode in the captured sequence of barcodes to obtain a plurality of data fragments and supplemental information associated with each data fragment; and reassembling the data from the data fragments using the supplemental information to reproduce the transmitted data.

According to a second aspect, there is provided a device for receiving data comprising: a storage device; a capture device arranged to capture a repeating sequence of barcodes and store the captured sequence on the storage device; and a processor arranged to: retrieve the captured sequence from the storage device; decode each barcode in the captured sequence of barcodes to obtain a plurality of data fragments and supplemental information associated with each data fragment; and reassemble the data from the data fragments using the supplemental information.

According to another aspect, there is provided a computer-implemented method of data transmission comprising: dividing data to be transmitted into a plurality of data fragments; generating a plurality of barcodes, each barcode encoding one of the data fragments and supplemental information; assembling the plurality of barcodes into a sequence for transmission; inserting a reference barcode between each barcode encoding one of the data fragments in the sequence for transmission; and displaying the sequence of barcodes on a display device a plurality of times as a repeating loop.

According to a further aspect, there is provided a device for data transmission comprising: a processor arranged to: partition data that is to be transmitted into a plurality of data fragments; generate a plurality of barcodes, each barcode encoding one of the data fragments and supplemental information; assemble the plurality of barcodes into a sequence for transmission; and insert a reference barcode between each barcode encoding one of the data fragments in the sequence for transmission; and a display device arranged to display the sequence of barcodes a plurality of times as a repeating loop.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
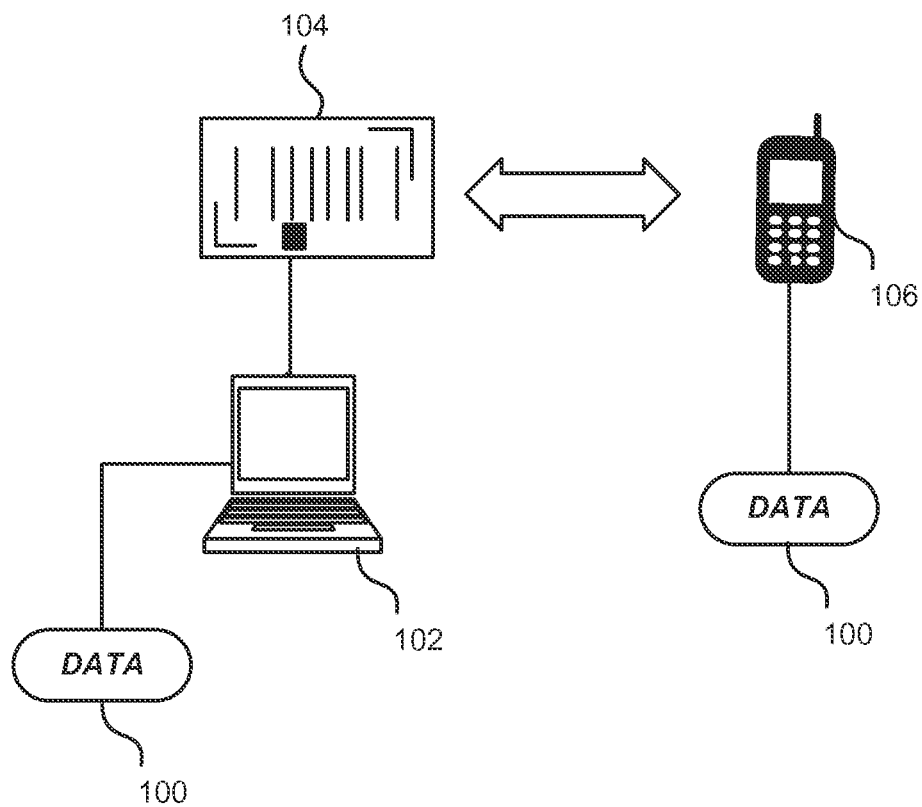
FIG. 1 is a schematic diagram of an example technique for transmitting data as a sequence of barcodes.

In the example of FIG. 1, a transmitting device 102 wants to pass a data item 100 to a receiving device 106. The data can be any relatively small packet of data, for example a certificate, a cryptographic signature, a photograph, contact details, medical/patient data or product information. The data can be static, for example contact details, which have previously been stored at the transmitting device, or can be dynamically generated, for example for use in cryptographic or medical applications. As mentioned above, radio-based techniques such as NFC or Bluetooth are not always appropriate or convenient for the transmission of this type of data. Barcodes can be used to pass small amounts of data between devices without requiring complex hardware, but the amount of data that can be encoded in a barcode is too low for the type of applications mentioned above. Note that the term "barcode" is used herein to refer to any type of pictorial datagram, including (but not limited to) linear (one-dimensional) barcodes representing the data by varying the width or spacing of parallel lines, and matrix (two-dimensional) barcodes which represents the data as a geometrical pattern, such as QR codes.

Described below is a technique for transmitting data using a sequence of barcodes, which enables a larger amount of data to be passed securely between devices, without requiring the use of complex or uncommon hardware. To achieve this, at the transmitting device 102 the data can be partitioned into a plurality of data fragments and each fragment can be encoded as a barcode. The plurality barcodes can be assembled into a sequence of barcodes and displayed as a repeating sequence of barcodes at a display device 104 associated with the transmitting device.

A receiving device 106 arranged to receive the sequence of barcodes may for example be a smart-phone comprising a camera which is arranged to record the barcode sequence. The receiving device 106 can either decode the sequence in real-time "on the fly" or store the sequence at a storage device in a video format or as a sequence of images for later decoding. Each barcode in the sequence can be decoded to obtain the stored data fragments and the fragments can be reassembled to obtain the entire data item 100. Because the data can only be captured on a direct line of sight with the transmitting device there is little chance that unauthorised users can read the data, in particular if the transmission of the barcode sequence is triggered manually by a user of the transmitting device. In addition, because the data transmission is one-way there is no chance of the transmitting device being illegally accessed and manipulated by a malicious user. Transmitting the data as a sequence of barcodes allows data to be transmitted securely from a first device without the receiving party or parties having access to the device through a two way pairing mechanism. This allows the device to be protected from potentially malicious parties.

In another example the aim is not secure transmission but to allow transmission of a greater volume of data than a single barcode would allow. For example many advertising posters on public transport have QR codes or other 2D barcodes which encode a URL to allow interested members of the public to access further product or service information (e.g. timetables, offers, etc.). However, these posters are frequently located in areas with little or no wireless internet or mobile network coverage (e.g. underground subway stations or on trains). By the time a user regains network coverage they may have deleted, or lost interest in, the stored information. In modern transport systems posters are increasingly being replaced with digital advertising displays that comprise one or more LCD screens transmitting a series of advertisements or short video clips. These screens can be used to transmit a short barcode sequence alongside an advertisement for a product which would provide additional information, therefore removing the need for immediate internet access. Because the user can access the information immediately they are less likely to lose interest or forget about the product/service.

Although the method, as described in FIG. 1 is described as being executed between two devices the skilled person will be aware that the method may be executed between multiple devices. For example where the method is being used to transmit product/service information multiple display screens may be used, each transmitting the sequence. In addition many users may capture the displayed sequence using their individual receiving devices.

Figure 2:
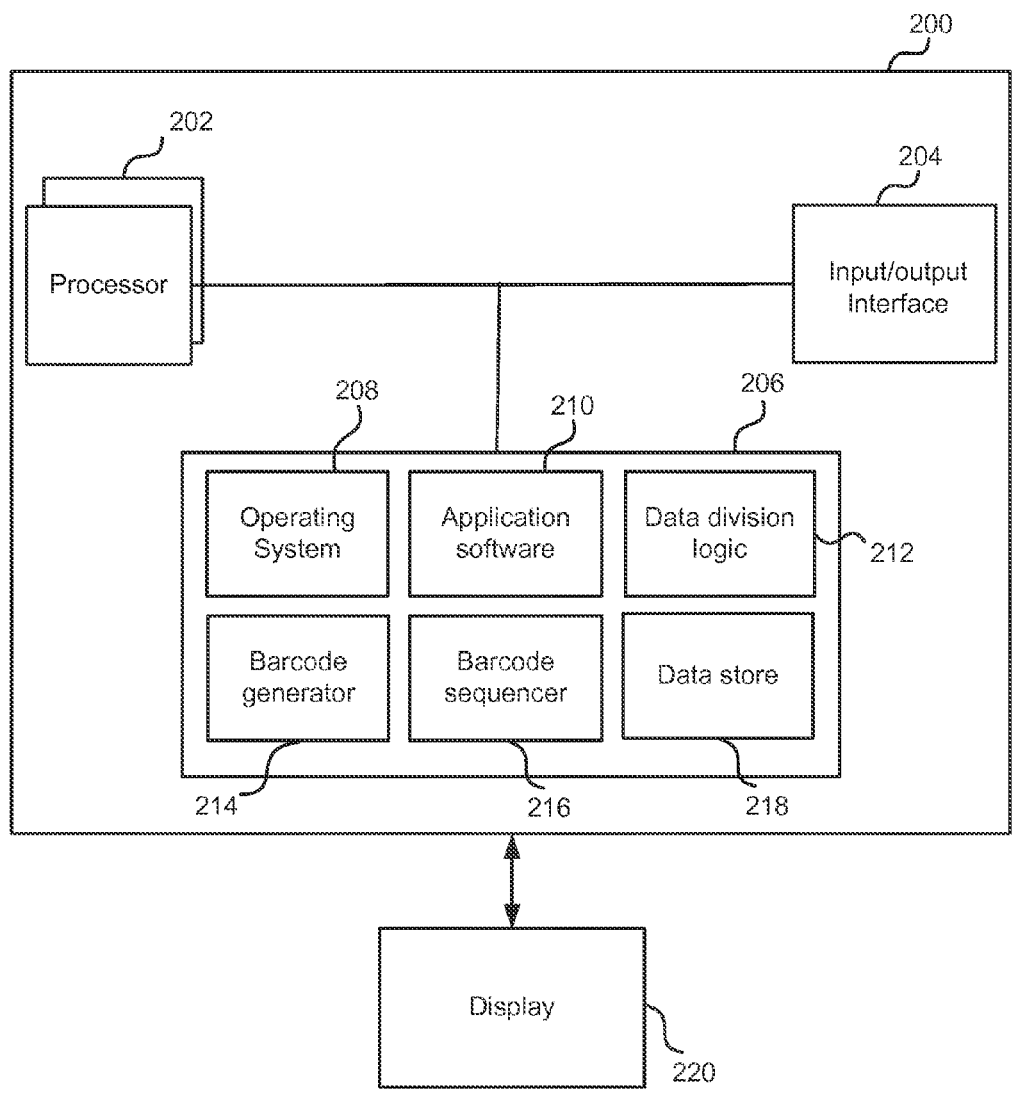
FIG. 2 is a schematic diagram which illustrates various components of an example computing-based device which may implement a technique for transmitting data using barcodes.

Reference is now made to FIG. 2, which illustrates various components of an example computing-based device 200 which may implement a method of transmitting data using barcodes (for example the method described with reference to FIG. 3 below). The computing-based device may be implemented as any form of a computing and/or electronic device in which embodiments of the system may be implemented. For example the computing based device may be implemented as a smart-phone or other mobile device or a static display screen.

The computing-based device comprises one or more processors 202 which may be microprocessors, controllers or any other suitable type of processors for processing computer executable instructions to control the operation of the device in order to manage and control transmission of data using barcodes.

The computing-based device also comprises at input/output interface 204, arranged to receive data, for example cryptographic data or media data. In some examples, the input/output interface may comprise a network interface arranged to send and receive data messages over a communication network. In examples, the input/output interface 204 may be a wireless interface, in other examples the input/output interface may be a wired interface.

Computer executable instructions may be provided using any computer-readable media that is accessible by the computing based device, such as a memory 206. Although the memory 206 is shown within the computing-based device it will be appreciated that the storage may be distributed or located remotely and accessed via a network or other communication link (e.g. using input/output interface 204).

Platform software comprising an operating system 208 or any other suitable platform software may be provided at the computing-based device to enable application software 210 to be executed on the device. Additional software provided at the device may include data division logic 212 for dividing data into a sequence of fragments, and a barcode generator 214 to generate a sequence of barcodes from the data fragments. A barcode sequencer 216 may also be provided to generate the sequence of barcodes for display. The functionality of these software elements is described in more detail below with reference to FIG. 3.

The memory 206 can also provide a data store 218, which can be used to provide storage for data used by the processors 202 when generating and displaying the barcode sequences. This can include storing of the data to be transmitted and storing the barcode sequences. As described in more detail below, the processor 202 can be arranged to access the data division logic 212 to partition a data item to be transmitted into a plurality of data fragments; the processor can be arranged to access the barcode generator 214 to generate a plurality of barcodes, each barcode comprising a fragment of data and supplemental information which indicates the position of the barcode and the total number of barcodes in the sequence. The processor 202 can then be further arranged to assemble the plurality of barcodes into a sequence for transmission using the barcode sequencer 216.

The computing based device 200 may also comprise a display 220, which may integrated with the device, or provided as a separate display which is in communication with the device, using for example input/output interface 204. The display can be arranged to transmit the data by displaying the barcodes as a repeating, looped sequence. The sequence may be repeated a predetermined number of times or indefinitely. In some examples the sequence may be displayed until a receiving device indicates that all the barcodes have been received. In an example the display 220 can be a smart-phone display screen. In another example the display can be a digital advertising display.

Figure 3:
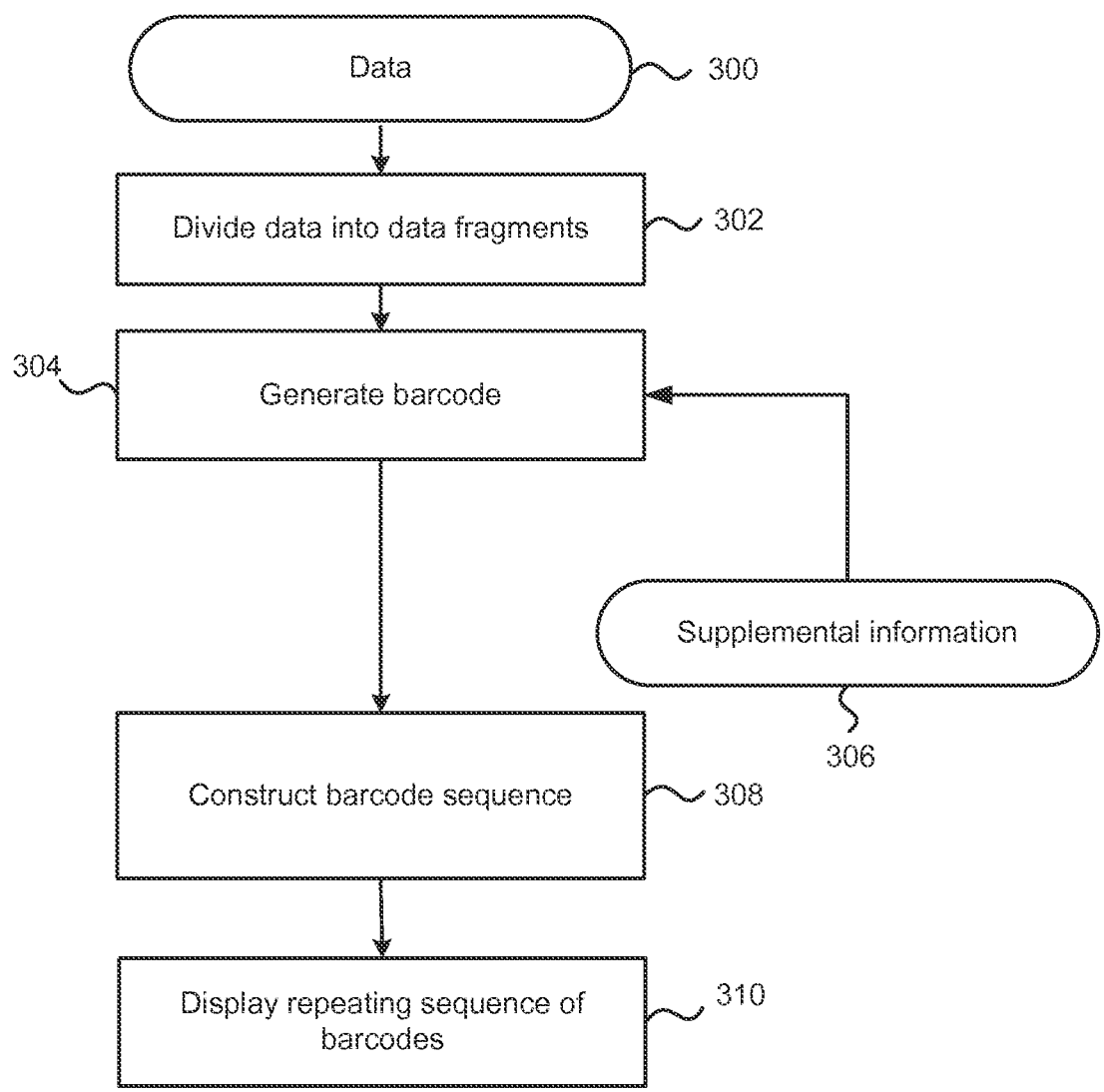
FIG. 3 is a flowchart of an example process for transmitting data using barcodes.

FIG. 3 is a flowchart of an example process for transmitting data using barcodes. Data 300 is received at computing-based device 200. The data may be received over a network or retrieved from a data store that is integral to the device. The data can be, as previously noted, cryptographic information, personal information, product information or other appropriate data.

The data is divided 302 into a plurality of data fragments. Each fragment is of a suitable size to be encoded as a barcode. Depending on the type of barcode to be used the data blocks or fragments may be of varying size, for example data which is to be encoded as a sequence of 1 dimensional barcodes may be divided into smaller fragments than data which is to be encoded as a 2 or higher dimensional barcode. Optionally, lossless data compression can also be applied to the data before it is divided.

Each of the data fragments is used to generate 304 a barcode. Each barcode that is generated encodes one of the data fragments and supplemental information 306. The supplemental information can be in the form of a data header comprising information identifying the data fragment associated with the header, and information indicating the total number of data fragments being encoded in the sequence (e.g. the headers indicate that this is fragment number 6 of 10, etc). In further examples, the supplemental information can also include the date and time of barcode generation or other information.

In some examples, the header contains the minimum amount of data necessary to allow the sequence to be reconstructed in order to reserve a maximum amount of space for data. For example, in systems where the number of barcodes in the sequence is not expected to exceed 99 then the header may only need to be four characters long.

The plurality of barcodes is assembled 308 into a sequence for transmission. Note that the barcode sequence can comprise the data fragments assembled in any order. The barcode sequence is transmitted 310 by displaying the sequence of barcodes as a looped or repeating sequence using a display (e.g. display 220) which is connected to the transmitting device. In some examples the order of the barcodes in the sequence to be transmitted may be varied each time the transmission of the barcode sequence is repeated. In other examples the order of the barcodes in the sequence to be transmitted may remain the same each time the sequence is transmitted.

Figure 4:
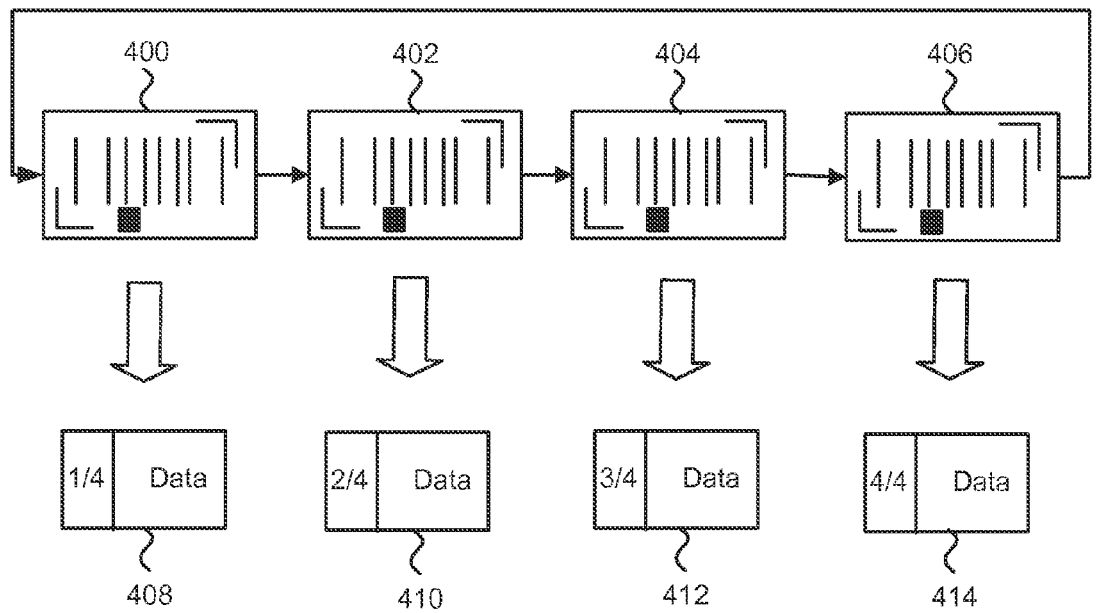
FIG. 4 is a schematic diagram of an example barcode sequence.

FIG. 4 illustrates a schematic diagram of an example barcode sequence. A sequence of barcodes 400-406 is transmitted as a repeating loop. In the example shown in FIG. 4 four barcodes are used to transmit four data fragments 408-414 and the supplemental information that indicates the number of fragments, and the position of the fragment in the sequence. It will be clear to the skilled person that the number of barcodes in the sequence will vary depending on the amount of data to be transmitted. As described in more detail below, the barcode sequence can be received by a device which has the appropriate receiver functionality and a connected digital camera (or other suitable reader) to capture the sequence.

In some embodiments each barcode in the sequence is interleaved with a reference barcode (i.e. a reference barcode is inserted between each consecutive barcode encoding a data fragment). The reference barcode may comprise an empty, data-less barcode (e.g. a frame which contains just a boundary and/or a target) or it may comprise a predetermined barcode encoding pre-known marker data. The use of a reference barcode can prevent the receiver camera defocusing between barcodes and can prevent confusion of the receiver capturing a portion of one code and a portion of the next code during a sequence transition. The use of a reference barcode provides a clear indication that the frame has changed.

Figure 5:
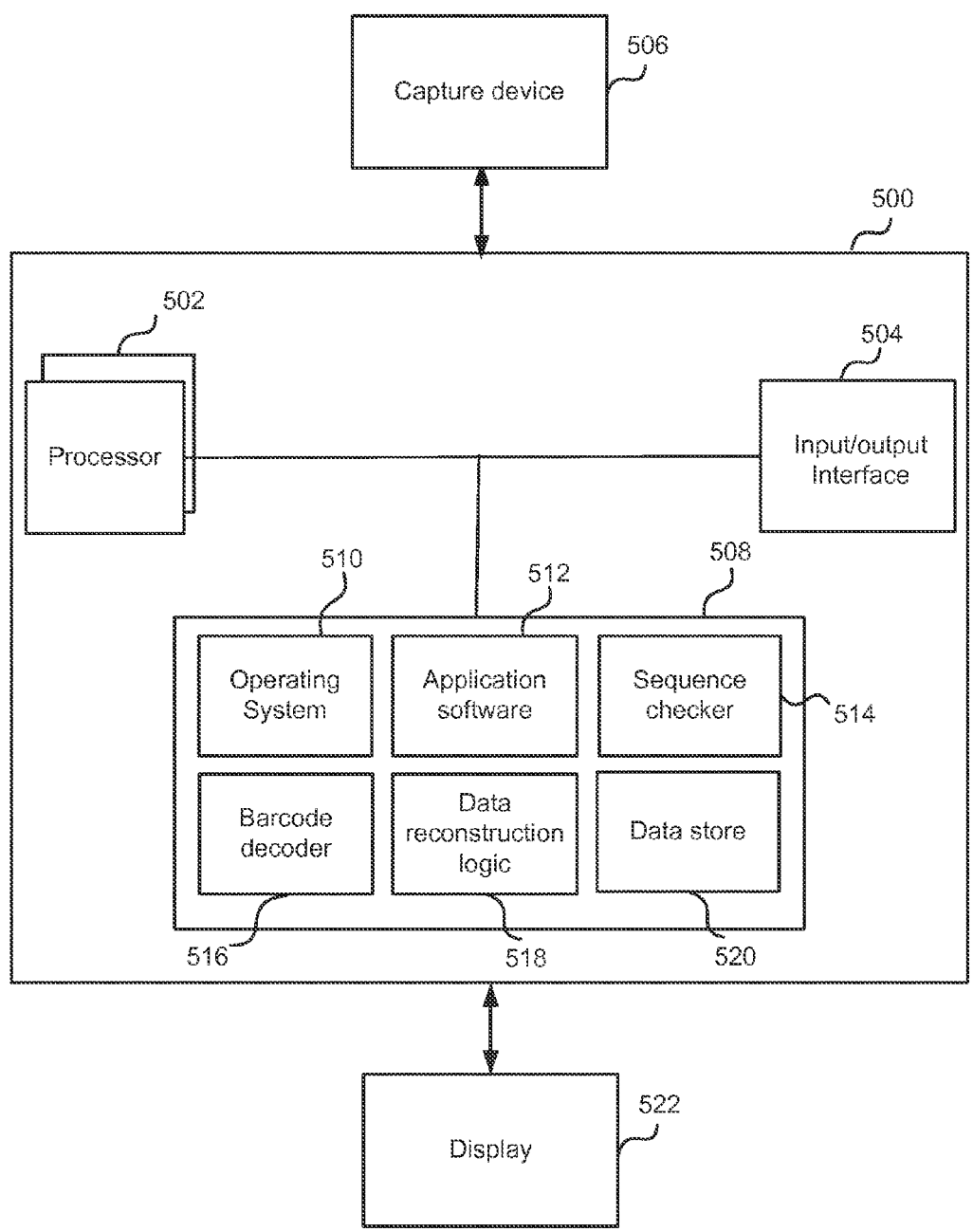
FIG. 5 is a schematic which illustrates various components of an example computing-based device which may implement a method of receiving data transmitted using barcodes.

Reference is now made to FIG. 5, which illustrates various components of an example computing-based device 500 which may implement a method of receiving data from a sequence of barcodes (for example the method described with reference to FIG. 6 below). As described with reference to FIG. 2 above for the transmitting device, the computing-based receiving device may be implemented as any form of a computing and/or electronic device in which embodiments of the transmission/receiver system may be implemented. For example the computing based device may be implemented as a smart-phone or other mobile device. Aspects of the computer-based transmission device described with reference to FIG. 2 and aspects of the computer-based receiving device described with reference to FIG. 5 may be implemented in the same device, for example a smart-phone, tablet computer or other device.

The computing-based receiving device comprises one or more processors 502 which may be microprocessors, controllers or any other suitable type of processors for processing computer executable instructions to control the operation of the device in order to manage and control the receipt and decoding of barcode sequences.

Optionally, the computing-based device also comprises an input/output interface 504. In some examples, the input/output interface may be a network interface arranged to send and receive data messages over a communication network. For example, where the received data comprises product information including a URL the input/output interface may arranged to connect to a network so that a user of the receiving device can access the information at the identified resource.

The computing based device 500 also comprises an integrated or attached capture device 506. In some examples the capture device 506 may be a still or video digital camera. The digital camera should have sufficient resolution to be able to read a barcode in a barcode sequence. In other examples the barcode capture interface may be a barcode scanner comprising a light source (for example an infra-red light source), a lens and a light sensor translating optical impulses into electrical ones.

Computer executable instructions may be provided using any computer-readable media that is accessible by the computing based device, such as memory 508. Although the memory 508 is shown within the computing-based device it will be appreciated that the storage may be distributed or located remotely and accessed via a network or other communication link (e.g. using input/output interface 504).

Platform software comprising an operating system 510 or any other suitable platform software may be provided at the computing-based device to enable application software 512 to be executed on the device. Additional software provided at the device may include barcode decoder 516 for reading transmitted barcodes and decoding the information encoded therein into transmitted data fragments and supplemental information. A sequence checker 514 may also be provided to determine if all the barcodes in the transmitted sequence have been received by checking the supplemental information. The computing based device 500 may also be provided with data reconstruction logic 518 that reassembles the decoded data fragments into the original data sequence (e.g. data 300).

As described in more detail below, the processor 502 can be arranged decode each captured barcode in the repeating sequence of barcodes into a data fragment and supplemental information using the barcode decoder 516. The processor can also be arranged to determine using the whether every barcode in the sequence has been captured by checking the decoded supplemental information. Once all the barcodes in the sequence have been captured the processor can be arranged to reconstruct the decoded data fragments to reproduce the transmitted data. Sufficient information is provided within the barcode that the data can be reconstructed even if the fragments are not captured in order. For example, as noted above information in the headers can be used to reconstruct the data.

The memory 508 can also provide a data store 520, which can be used to provide storage for data used by the processor 502 when receiving and decoding the data. For example, the barcode sequences can be stored as a video sequence for decoding at a later time and the decoded information may be stored at the data store. For example a device may store transmitted cryptographic keys or other information for later use The computing based device 500 may also comprise a display 522, which may integrated with the device, or a separate display which is communication with the device, using for example input/output interface 504. For example the display 522 may be used to display received data to the user of the device. In another example the display may be used to indicate to the user of the device that all of the barcodes in the sequence have been captured and the user can stop recording. In some examples, the receiving device 500 may also send a signal to the transmitting device (e.g. transmitter device 200) using input/output interface 504 to indicate that all the barcodes in the sequence have been received and the transmitting device can cease transmitting the sequence. For example, the receiving device may provide this signal as an audio signal or radio signal to the transmitting device.

Figure 6:
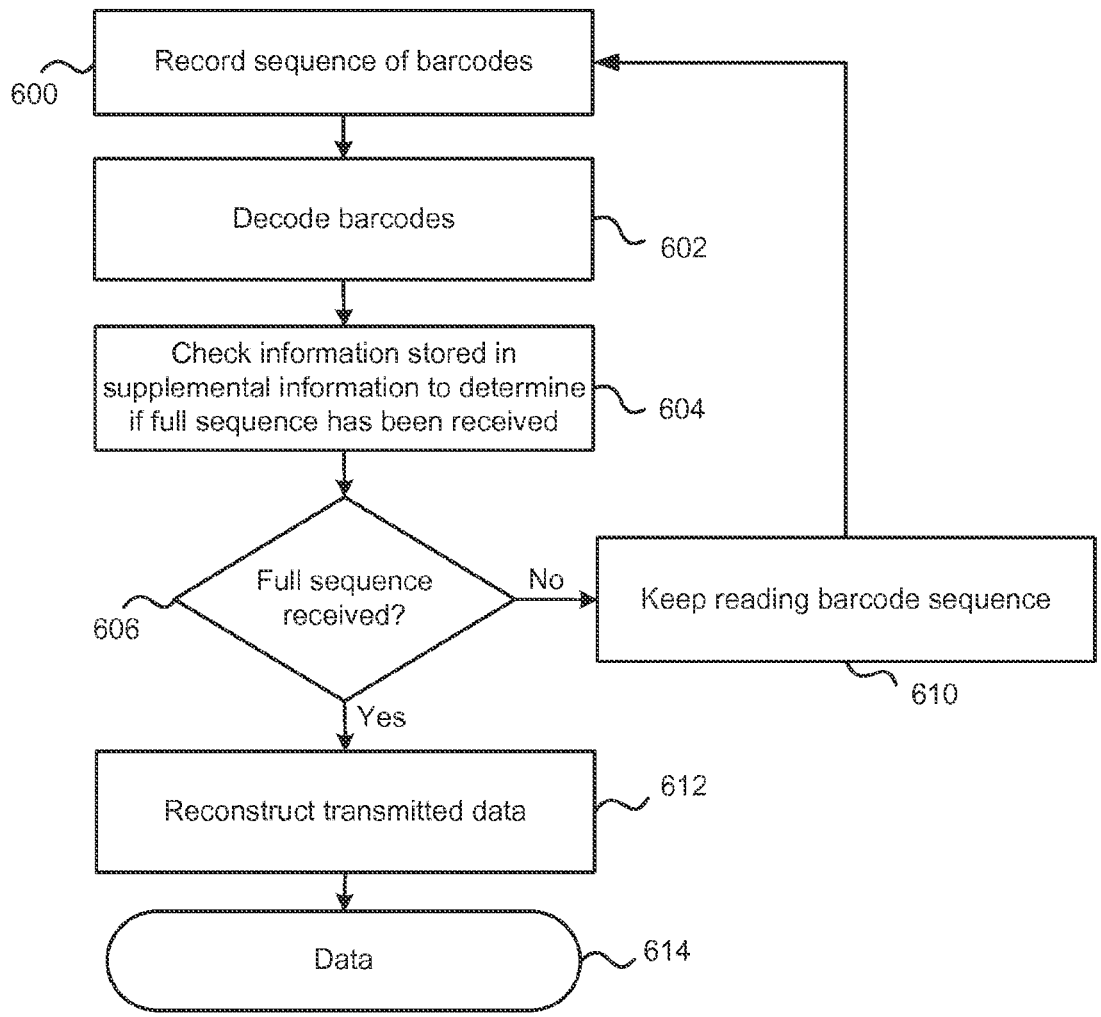
FIG. 6 is a flowchart of an example process for receiving data transmitted using barcodes.

FIG. 6 is a flowchart of an example process for receiving data from a barcode sequence. A receiving device (for example the device 500 shown in FIG. 5) captures 600 a repeating sequence of barcodes being displayed on a screen. Each barcode is decoded 602 using e.g. barcode reading software 512 into a data fragment and supplemental information. In one example the sequence is decoded "on the fly" (i.e. in real time as the barcode sequence is being displayed). This enables the data to be received with no record of the sequence being kept. In alternative examples the barcode sequence may be captured and stored as a video clip or sequence of still frames. This video clip or sequence of still frames can then be accessed by the processor and the barcodes decoded. This enables the decoding to be done "offline", i.e. subsequent to the capture of the sequence. It can also enable the sequence to be displayed more rapidly, as the decoding does not need to be performed within the time period of each transition between barcodes in the sequence.

The information stored in the supplemental information is checked 604 to determine 606 whether or not every barcode in the sequence has been read. For example, the processor can determine from the supplemental information indicating the total number of fragments in the sequence whether all of the distinct fragments have been read. In addition, the data fragment identifiers enable the processor to determine which (if any) fragments are missing. If the full sequence has not been received the receiving device keeps reading 610 the repeating sequence until all the barcodes that are required to reconstruct the data fragments are captured. Once all the barcodes in the repeating sequence have been captured and decoded. The data fragments can be reassembled 612 to reproduce the transmitted data 614. The supplemental information indicating the data fragment identifiers enables the data fragments to be reassembled in the correct order.

As mentioned above, in some examples the sequence is captured in real time, for example using a digital camera as the capture device 506. Each barcode is captured as it flashes up in the sequence and the receiving device attempts to decode the barcode. The receiving device can also optionally check whether the barcode has been properly captured. The device keeps reading until all the barcodes in the sequence are captured and decoded and the user is notified when the sequence is fully captured. By ensuring each barcode in the sequence is accurately captured (in addition to any error correction which may be automatically built into the barcode) the risk of data corruption can be minimised. However, the receiving device receives the sequence at a slower rate, which means that data transfer will take longer.

In other examples the capture device 506 can record the sequences as a video at a high frame rate, for example in excess of 10 frames per second. The video sequence can then be accessed at a later point in time and analysed frame by frame. The video sequence must be recorded for long enough to ensure that the barcode sequence can be captured reliably. In some examples, if the video sequence is insufficiently long enough to ensure the sequence has repeated a number of times the user can be notified and asked to re-record. Using non real-time decoding of the data allows for much faster display of the barcode sequence as there is no need to decode in real time. This can enhance usability of the system, as the user does not need to hold the capture device in front of the barcode sequence for as long a time period as is the case for a real-time capture system.

Computer-readable media, as used herein, may include, for example, computer storage media such as memory 206, 506 and communications media. Computer storage media, such as memory 206, 506, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of receiving data comprising;
    capturing a repeating sequence of barcodes using a capture device;
    storing the captured sequence of barcodes on a storage device for decoding at a later time;
    subsequently retrieving the captured sequence from the storage device;
    decoding each barcode in the captured sequence of barcodes to obtain a plurality of data fragments and supplemental information associated with each data fragment; and
    reassembling the data from the data fragments using the supplemental information to reproduce the transmitted data.

2. A method according to claim 1, wherein the captured sequence is stored as a video on the storage device.

3. A method according to claim 2, wherein retrieving the captured sequence from the storage device comprises accessing the stored video and analysing it frame by frame.

4. A method according to claim 1, wherein the supplemental information comprises one or more of: an identifier for the data fragment encoded in that barcode and an indicator of the total number of data fragments in the sequence.

5. A method according to claim 4, wherein the reference barcode comprises a barcode encoding no data, or a barcode encoding a predefined data item.

6. A method according to claim 1, wherein the sequence of barcodes comprises a reference barcode inserted between each barcode which encodes a data fragment.

7. A method according to claim 1, wherein the data comprises dynamically generated data or static data which has previously been stored at the transmitting device.

8. A method according to claim 1, wherein the repeating sequence of barcodes is captured at a frame rate in excess of 10 frames per second.

9. A device for receiving data comprising:
    a storage device;
    a capture device arranged to capture a repeating sequence of barcodes and store the captured sequence on the storage device for decoding at a later time; and
    a processor arranged to: subsequently retrieve the captured sequence from the storage device; decode each barcode in the captured sequence of barcodes to obtain a plurality of data fragments and supplemental information associated with each data fragment; and reassemble the data from the data fragments using the supplemental information.

10. A device according to claim 9, wherein the capture device comprises a camera.

11. A device according to claim 9, wherein the capture device stores the captured sequence of barcodes as a video or a series of still image frames on the storage device.

12. A device according to claim 11, wherein the capture device stores the captured sequence of barcodes as a video and the processor is arranged to retrieve the video from the storage device analyze it frame by frame.

13. A computer-implemented method of data transmission comprising;
    dividing data to be transmitted into a plurality of data fragments;
    generating a plurality of barcodes, each barcode encoding one of the data fragments and supplemental information;
    assembling the plurality of barcodes into a sequence for transmission;

inserting a reference barcode between each barcode encoding one of the data fragments in the sequence for transmission; and displaying the sequence of barcodes on a display device a plurality of times as a repeating loop.

14. A method according to claim 13, wherein the reference barcode comprises a barcode encoding no data, or a barcode encoding a predefined data item.

15. A method according to claim 13, further comprising compressing the data prior to partitioning.

16. A method according to claim 13, further comprising the step of ceasing display of the barcode sequence responsive to receiving an indication from a receiving device that all the barcodes in the sequence have been captured.

17. A method according to claim 13, wherein displaying the sequence of barcodes on a display device a plurality of times as a repeating loop comprises varying an order of the barcodes in the sequence each time the display of the sequence of barcodes is repeated.

18. A method according to claim 13, wherein the display device is a smartphone display screen or a digital advertising display.

19. A method according to claim 13, wherein displaying the sequence of barcodes on a display device a plurality of times as a repeating loop comprises displaying the barcode sequence a predetermined number of times.

20. A method according to claim 13, wherein displaying the sequence of barcodes on a display device a plurality of times as a repeating loop comprises repeating the barcode sequence indefinitely.

* * * * *